Oct. 4, 1955
B. T. WOOD
2,719,555
FRUIT STEMMING MACHINE
Filed Aug. 15, 1952
2 Sheets-Sheet 2
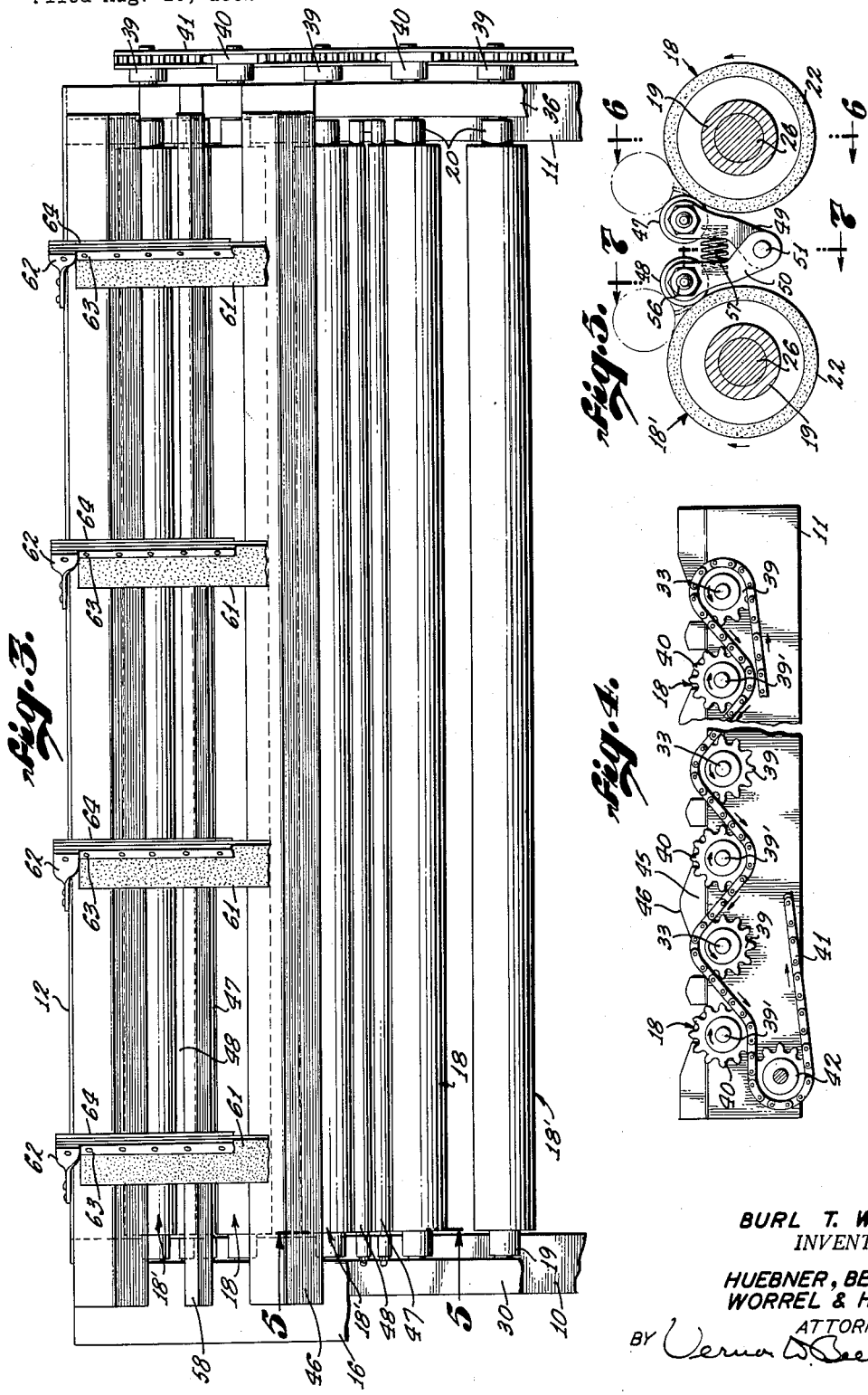
BURL T. WOOD,
INVENTOR.
HUEBNER, BEEHLER,
WORREL & HERZIG,
ATTORNEYS.

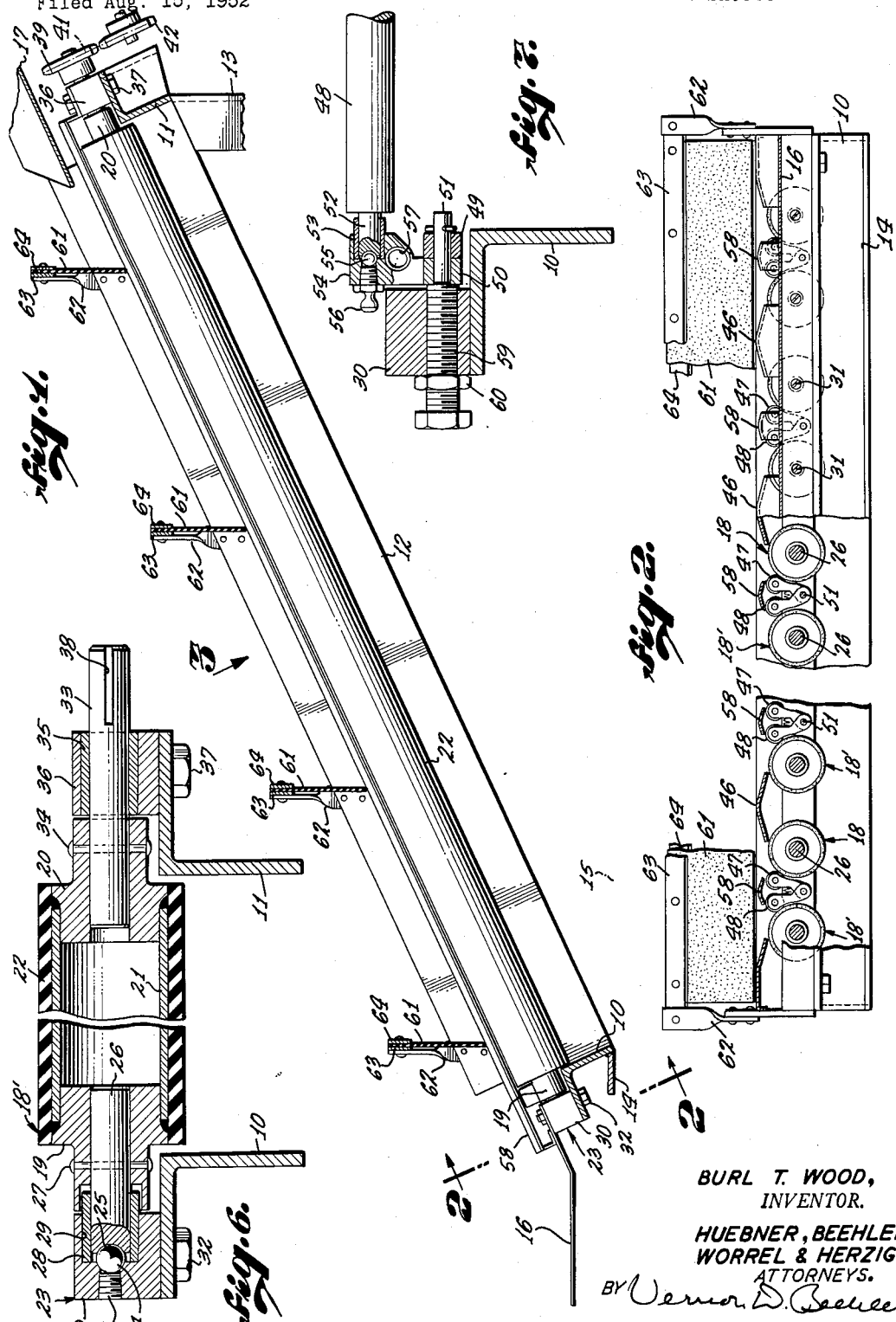

United States Patent Office 2,719,555
Patented Oct. 4, 1955

2,719,555

FRUIT STEMMING MACHINE

Burl T. Wood, Lindsay, Calif., assignor to Lindsay Ripe Olive Company, Lindsay, Calif., a corporation of California Application August 15, 1952, Serial No. 304,525

9 Claims. (Cl. 146—55)

The invention relates to fruit processing apparatus and has particular reference to a machine adapted to remove the stems and also the leaves and branches if need be from fruit of the nature of olives.

The stemming of fruit presents a variety of problems depending in part upon the firmness of the fruit from which the stems are to be removed, the shape of the fruit, the size of the fruit, and also the quantity of stems or branches and even leaves which may be attached thereto. The mechanical stemming of fruit is an important step in fruit processing particularly of small fruit such as olives wherein it would be entirely impractical to stem by hand and which stemming at the same time must be so effectively done that no stems or any stubbed portions thereof remain upon the processed fruit. Moreover, the demand for effective stemming at an economical rate has increased the acceptability of relatively small machines having sufficient speed of operation to provide the required capacity.

Among the objects of the invention is to provide a new and improved machine adapted to the removal of stems and branches from fruit in the nature of olives which is relatively simple in its construction, inexpensive, and at the same time relatively easy to maintain in effective operating condition.

Another object of the invention is to provide a new and improved stemming machine for fruit in the nature of olives which is capable of processing relatively large quantities of the fruit with an equal degree of effectiveness and at the same time without bruising or damaging the fruit.

Still another object of the invention is to provide a new and improved machine for removing stems, branches and leaves from fruit in the nature of olives which is provided with a series of trips limiting the quantity of fruit accumulating at a given location along the machine, which limiting means is capable of discharging periodically as the accumulation of fruit builds up, the discharge at periodic intervals being adapted to greatly improve the effectiveness of stem removal as the fruit passes from a charging end to a discharging end.

Still another object of the invention is to provide a new and improved stem and trash removing mechanism for cleaning fruit of somewhat ovoid shape which employs a combination of friction roll and smooth roll so mounted that pressure between surfaces of the respective rolls can be readily set and maintained in order to provide substantially a maximum effectiveness in the removal of the stems, branches, leaves, etc., the arrangement of rolls in pairs being such that a device of substantially any desired capacity can be employed merely by having added thereto a sufficient number of pairs of rollers to accommodate the expected quantity of fruit.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side view of the stem removing rollers showing mounting portions of the machine in section.

Figure 2 is a cross-sectional view of the roller construction taken on the line 2—2 of Figure 1.

Figure 3 is a top view at an angle normal to the axes of the rollers in the direction of the arrow 3 of Figure 1 showing portions of the baffles removed.

Figure 4 is a right end view of the rollers and sprocket drive therefor.

Figure 5 is an enlarged cross-sectional view of a pair of frictionally surfaced rollers and smooth surfaced rollers lying therebetween.

Figure 6 is a longitudinal sectional view of one of the frictionally surfaced rollers taken on the line 6—6 of Figure 5 with the roller foreshortened.

Figure 7 is a longitudinal sectional view taken on the line 7—7 of Figure 5.

The fruit stemming machine herein shown and described is one especially effective in the processing of ripe and green olives. The machine is moreover such that rollers work in pairs, each being in effect a complete stemming mechanism such that virtually any number of pairs of rollers may be employed side by side making it possible to construct the machine having virtually any desired capacity.

As illustrated there is provided a frame consisting of a low horizontal mounting member 10 and a high horizontal mounting member 11 joined together by means of a beam 12. A leg 13 supports the high horizontal member in a position such that the tilt of the beam 12 is in the neighborhood of 25° from the horizontal. A shoe or foot piece 14 may be provided on the low horizontal member supported effectively upon some suitable surface such as a floor 15. Adjacent the low member is a discharge pan 16 and adjacent the high member is a feed chute 17. The high and low horizontal members being positioned such that the stemming mechanism is pitched at a downwardly sloping angle of about 25° sets the travel of fruit on a practically advantageous slope taking into consideration the character of the fruit, the amount of stems, branches, and leaves attached, the size of fruit, and the number of baffles employed.

The stemming mechanism consists in part of a series of pairs of frictionally surfaced rollers 18, 18' identical in all respects. Each of the rollers 18 or 18' as the case may be is constructed of a lower bushing 19, an upper bushing 20, and a tube 21 extending therebetween. Around the exterior of the tube is a friction surface preferably of rubber or rubber-like material 22 which is resilient in character.

The lower bushing 19 is mounted on the low mounting member 10 by means of a ball thrust bearing 23, details of which are best illustrated in Figure 6. The ball thrust bearing comprises essentially a ball 24 adapted to be positioned in a pocket 25 at the lower end of a stub shaft 26, the stub shaft in turn being keyed in the lower bushing 19 by means of a pin 27. The lower end of the stub shaft rotates within a bearing sleeve 28 in turn held within a suitable bore 29 in a bearing block 30. An adjusting plug 31 may be employed if need be to adjust the tightness of the ball thrust bearing. The bearing block as illustrated may be of sufficient length to accommodate all of the rollers and is shown fastened to the low mounting member by means of bolts 32.

At the upper end of the roller is a stub shaft 33 likewise keyed to the bushing 20 by means of a pin 34, the stub shaft being received in a bearing sleeve 35 in a bearing block 36. The bearing block 36 is also made of sufficient length to accommodate a number or, as illustrated here, all of the bearings at the upper end of the rollers, the bearing block being secured to the high mounting member 11 by means of bolts 37.

At the upper end of each stub shaft 33 is a keyway 38 by means of which a sprocket 39 may be keyed to the stub shaft in order to rotate the respective roller. The adjacent roller is also provided with a sprocket 40 on its stub shaft 39' so that a chain drive 41 extending around a driving sprocket 42 is adapted to drive all of the rollers in a proper direction of rotation. The source of power for the chain drive has been omitted in the interest of clarity inasmuch as the drive is of a conventional character at this portion of the device.

When the chain drive travels in the direction of the arrow illustrated in Figure 4 it will become apparent that the roller upon which the sprocket 39 is mounted, which may be considered to be the roller 18, rotates in a counter-clockwise direction as viewed in Figures 4 and 5, whereas the roller 18' and its sprocket 39' rotate in a clockwise direction as viewed in the same figures. Rotating in these respective directions causes the rollers to rotate toward a valley in effect which lies between them. The roller 18, for example, and the next adjacent roller 18' have what may be considered as a valley 45 between them in which the rollers or rather the circumferences of the rollers are in effect moving upwardly. The valley 45 is spanned by a shield 46 so that no fruit can fall into that valley. The valley between the right-hand pair of rollers 18', 18 of Figure 4 may be considered as a valley 44 wherein the circumferences of the rollers have a generally downwardly direction toward each other.

Mounted between alternate pairs of rollers 18, 18' as viewed in Figure 5 and within the valley 44 therebetween, in which the general direction of the circumference of the rollers is downwardly, is a pair of smooth-surfaced rollers 47, 48. These rollers mounted as illustrated in Figure 5 are provided respectively with brackets 49 and 50, the brackets being pivotally mounted upon a shaft 51. The same bracket construction may be advantageously employed at both ends of the rollers 47, 48. For illustrative purposes the mounting of the roller 48 has been depicted in Figure 7, a description of which will suffice also for the roller 47. As there shown the roller 48 has an end shaft 52 of reduced diameter confined within a bearing sleeve 53 which in turn is contained within a bearing block 54. A ball thrust 55 is likewise found advantageous in mounting the roller 48, the ball thrust 55 being seated within a suitable recess in the end shaft 52. It has also been found advantageous to employ a "Zerk" fitting 56 for effectively adjusting the ball thrust 55.

The rollers 47 and 48 are urged apart by compression springs 57 as best illustrated in Figure 5. The compression spring may be selected as one capable of giving the proper degree of thrust to force the roller 48 against the roller 18' and the roller 47 against the roller 18. To protect each pair of rollers 47, 48 there is provided a shield 58 of just sufficient width to extend to about the middle of each roller and throughout the length of the rollers, thereby preventing any fruit from falling between the smooth rollers 47, 48.

A bracket construction similar to the brackets 49 and 50 may be employed at the upper ends of the rollers 48 with the exception that the ball thrust 55 and "Zerk" fitting 56 may be dispensed with inasmuch as there is no thrust at the upper ends of the smooth rollers.

To adjust the smooth rollers there may be provided in the bearing block 30 an adjusting screw 59 which, if desired, may provide the means of mounting the shaft 51. By rotating the adjusting screw 59 inwardly or outwardly the brackets 49, 50 may be shifted in or out to either tighten or loosen the adjustment. A lock nut 60 is employed for fixing the position of adjustment.

In order to distribute the fruit over the rollers during passage from the feed chute to the discharge pan there is provided a series of flexible baffles 61. Four are shown in Figures 1 and 3. For mounting the baffles brackets 62 are fastened to the outermost beams 12, the brackets having braces 63, 64 extending across the rollers from one side to the other to which the flexible baffles 61 are attached. The baffles are made wide enough so that they hang to about the level of the shields 46 and 58. As the fruit is charged from the feed chute to the rollers, the fruit is temporarily detained by the uppermost baffle 61. As the fruit piles up the baffle flexes permitting some of the fruit to roll one deep beneath the baffle and to tumble along the openings between adjacent smooth and friction surfaced rollers until the fruit strikes the next lower baffle. From there the fruit is again permitted to roll beneath the baffle when a sufficient quantity accumulates and this continues to occur until the fruit rolls stem free beneath the lowermost baffle 61 to the discharge pan 16.

Fruit may be fed from the feed chute with stems, branches and leaves attached. As the fruit tumbles, the stem, branch or leaf is caught frictionally by the exterior surface of the roller 18 or 18', as the case may be, and rolled between the frictionally surfaced roller and the immediately adjacent smooth surfaced roller. As the stem or branch is caught between the rollers, it is torn from the fruit, leaving the fruit clean. The shields between the smooth rollers deflect the fruit to a location between the smooth roller and the next adjacent frictionally surfaced roller, these being the shields 58. The shields 46 act similarly to deflect the fruit to the proper stemming position and to prevent the fruit from falling between the rollers.

Assuming a satisfactory slope for the rollers, such as approximately the slope shown, the speed of rotation of the rollers may be adjusted to such a rate that fruit caught and spread by the baffles is effectively cleaned of all stems and trash before the fruit finally emerges from beneath the lowermost baffle 61. This adjustment is readily achieved by observing the out-flow of fruit and a thoroughly cleaned pack of fruit may be assured at all times.

In commercial practice rollers about four feet long have been found effective, one unit having employed sixteen rollers of 2½-inch diameter spreading over a five-foot width over all. The smooth surfaced rollers are effective when proportionately smaller than the 2½-inch frictionally surfaced rollers to the extent illustrated in the drawings.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention herein, what I claim as new and desire to secure by Letters Patent is:

1. A fruit stemming machine comprising a frame and a pair of parallel relatively large rollers mounted in said frame in position spaced laterally one from another and sloping relative to horizontal, a drive for the rollers operating to rotate the rollers downwardly in opposite directions, a pair of relatively smaller rollers lying in space between and extending throughout the length of the large rollers, said smaller rollers having a common shaft in the space between the large rollers and brackets pivotally mounting the smaller rollers on said shaft for movement transversely toward said large rollers, and spring means biased to urge the smaller rollers against the respective large rollers, one pair of said rollers having resilient soft friction surfaces of smooth circumference and the other pair of said rollers having hard smooth surfaces whereby during operation stems are drawn downwardly between contacting rollers and fruit is retained above said rollers.

2. An olive stemming machine comprising a frame and a plurality of parallel relatively large rollers mounted in said frame in position sloping relative to horizontal and laterally spaced equally one from another leaving valleys therebetween, a relatively soft cover for each of said rollers having a high coefficient of friction, sprockets on the rollers at the same relative ends and a drive for the sprockets operating to rotate adjacent rollers in opposite directions wherein rotation is generally downwardly in alternate valleys and generally upward in intermediate valleys, a pair of relatively small smooth hard-surfaced rollers in each of the valleys wherein the direction of rotation is generally downwardly, said hard-surfaced rollers extending throughout the length of the large rollers in engagement therewith above the axis of the large rollers, each roller of each pair of the hard-surfaced rollers having brackets extending into the respective valley and a shaft in the valley pivotally mounting brackets of each pair of hard-surfaced rollers on the frame, and a coiled spring between adjacent brackets biased to urge the hard-surfaced rollers against the respective relatively large rollers whereby during operation stems are drawn downwardly between contacting rollers and olives are retained above said contacting rollers.

3. A fruit stemming machine comprising a frame having a relatively low horizontal member at one end, a relatively high horizontal member at the other end and parallel thereto, a series of friction-surfaced rollers mounted on said members in a sloping position relative to horizontal and spaced laterally one from another forming valleys therebetween, and a drive for the rollers adapted to operate in a direction wherein adjacent rollers are driven in opposite directions of rotation downwardly in said valleys, a pair of relatively small smooth-surfaced rollers in said valleys between the friction-surfaced rollers wherein rotation is generally downward, said smooth-surfaced rollers being spring-pressed into contact each with the respectively adjacent friction-surfaced roller, shielding means over the rollers except where smooth-surfaced rollers engage the respective friction-surfaced rollers, and a plurality of laterally spaced resilient baffles extending parallel to each other and transversely to the rollers, said baffles having resiliently swinging depending free ends positioned to brush said shielding means thereby temporarily to restrain the passage of fruit until the weight of accumulated fruit forces the free ends to yield whereby to release fruit from one baffle to accumulate on the next lower baffle.

4. A fruit stemming machine comprising a frame having a relatively low horizontal member at one end, a relatively high horizontal member at the other end and parallel thereto, a series of friction-surfaced rollers mounted on said members in a sloping position relative to horizontal and spaced one from another forming valleys therebetween, and a drive for the rollers adapted to operate in a direction wherein adjacent rollers are driven in opposite directions of rotation downwardly, a pair of smooth-surfaced rollers in said valleys between the friction-surfaced rollers wherein rotation is generally downward, said smooth-surfaced rollers being spring-pressed into contact each with the respectively adjacent friction-surfaced roller, relatively flat shielding means over the valleys between the smooth-surfaced rollers and relatively flat shielding means over only those portions of the friction-surfaced rollers which have a generally upward travel at the circumference.

5. A fruit stemming machine comprising a frame having a relatively low horizontal member at one end and a relatively high member at the other end parallel thereto, a series of pairs of frictionally-surfaced rollers mounted on said members in a fixed sloping position relative to horizontal and laterally spaced one from another forming valleys therebetween, and a drive for the rollers adapted to operate in a direction wherein adjacent rollers are driven in opposite directions of rotation downwardly in said valleys, a pair of smooth-surfaced rollers in the valleys between the frictionally-surfaced rollers wherein rotation is generally downward, said smooth-surfaced rollers being spring-pressed into contact each with the respectively adjacent friction-surfaced roller, a shielding means over the smooth-surfaced roller, a shielding means over those portions only of the friction-surfaced rollers where the travel is in a generally upward direction, and a series of horizontal transverse resilient baffles parallel to each other and located at laterally spaced intervals along the rollers and having a support on the frame in position wherein the bottom of each baffle is free from support and yieldingly brushes the shielding means.

6. An olive stemming machine comprising a frame having a relatively low horizontal member at one end and a relatively high horizontal member parallel thereto at the other end, a series of parallel friction-surfaced rollers mounted at opposite ends thereon on said members in a sloping position of about 25° relative to horizontal, said rollers being in pairs spaced apart laterally leaving a valley therebetween, sprockets at the upper ends of the rollers and a chain drive engaging the sprockets in positions adapted to drive adjacent sprockets in opposite directions of rotation, a pair of relatively small smooth-surfaced rollers in valleys between the friction-surfaced rollers where rotation is generally downward, said smooth-surfaced rollers being spring-pressed into contact each with the respectively adjacent parallel roller, a shield over the valley between each pair of relatively small smooth-surfaced rollers and a shield over each valley between friction-surfaced rollers where rotation is generally upward, a series of laterally spaced horizontal resilient baffles parallel to each other in positions transverse to the rollers and having a support on the frame in position wherein the bottom of each baffle is free and yieldingly brushes the shields, a feed chute at the upper ends of the friction-surfaced rollers and a delivery trough at the lower ends of said friction-surfaced rollers.

7. A trash removing machine for fruit comprising a first pair of parallel rollers mounted in said frame in position spaced laterally one from another and sloping relative to horizontal, a drive for the rollers operating to rotate the rollers downwardly in opposite directions, a second pair of rollers lying in the space between and extending throughout the length of respectively adjacent rollers first identified, mounting means in the spaces between the first identified rollers, and brackets pivotally mounting the second identified rollers on said mounting means for movement transversely toward said first identified rollers, and spring means biased to urge the second identified rollers against the first identified rollers, one pair of said rollers having resilient soft friction surfaces of smooth circumference and the other pair of said rollers having hard smooth surfaces whereby during operation trash is drawn downwardly between contacting rollers and fruit is retained above said rollers.

8. A trash removing machine for fruit comprising a first pair of parallel rollers mounted in said frame in position spaced laterally one from another and sloping relative to horizontal, a drive for the rollers operating to rotate the rollers downwardly in opposite directions, a second pair of rollers lying in the space between and extending throughout the length of respectively adjacent rollers first identified, a common shaft in the spaces between the first identified rollers, and brackets pivotally mounting the second identified rollers on said common shaft for movement transversely toward said first identified rollers and spring means biased to urge the second identified rollers against the first identified rollers, one pair of said rollers having resilient soft friction surfaces of smooth circumference and the other pair of said rollers having hard smooth surfaces whereby during operation trash is drawn downwardly between contacting rollers and fruit is retained above said rollers.

9. A fruit stemming machine comprising a frame and a pair of parallel relatively large rollers mounted in said frame in position spaced laterally one from another and sloping relative to horizontal, a drive for the rollers operating to rotate the rollers downwardly in opposite directions, a pair of relatively smaller rollers lying in the space between and extending throughout the length of the large rollers, mounting means in the space between the large rollers and brackets pivotally mounting the smaller rollers on said mounting means for movement transversely toward said large rollers, and spring means biased to urge the smaller rollers against the respective large rollers, one pair of said rollers having resilient soft friction surfaces of smooth circumference and the other pair of said rollers having hard smooth surfaces whereby during operation stems are drawn downwardly between contacting rollers and fruit is retained above said rollers.

References Cited in the file of this patent

UNITED STATES PATENTS

| | | |
|---|---|---|
| 68,085 | Kenyon | Aug. 27, 1867 |
| 497,693 | Taylor | May 16, 1893 |
| 655,408 | Madsen | Aug. 7, 1900 |
| 1,622,207 | Powell | Mar. 22, 1927 |
| 1,635,569 | Ayars | July 12, 1927 |
| 1,641,436 | Jett | Sept. 6, 1927 |
| 1,703,123 | Triplett | Feb. 26, 1929 |
| 1,835,190 | Stansbury | Dec. 8, 1931 |
| 2,527,303 | Gaddie | Oct. 24, 1950 |
| 2,537,355 | Lapeyre et al. | Jan. 9, 1951 |